(12) United States Patent
Sauter et al.

(10) Patent No.: US 10,029,713 B2
(45) Date of Patent: Jul. 24, 2018

(54) RAIL HANDBRAKE WITH PROLONGED RELEASE

(71) Applicant: NEW YORK AIR BRAKE, LLC, Watertown, NY (US)

(72) Inventors: Jeffrey F. Sauter, Lowville, NY (US); Steven Newton, Adams, NY (US); Taylor Estelle, Weedsport, NY (US)

(73) Assignee: New York Air Brake, LLC, Watertown, NY (US)

( * ) Notice: Subject to any disclaimer, the term of this patent is extended or adjusted under 35 U.S.C. 154(b) by 234 days.

(21) Appl. No.: 14/593,324

(22) Filed: Jan. 9, 2015

(65) Prior Publication Data

US 2016/0200329 A1    Jul. 14, 2016

(51) Int. Cl.
*B61H 13/04* (2006.01)
*B60T 13/66* (2006.01)
*B60T 17/22* (2006.01)

(52) U.S. Cl.
CPC ............ *B61H 13/04* (2013.01); *B60T 13/665* (2013.01); *B60T 17/228* (2013.01)

(58) Field of Classification Search
CPC .............................. B61H 13/04; B60T 17/228
See application file for complete search history.

(56) References Cited

U.S. PATENT DOCUMENTS

| 3,425,294 A | 2/1969 | Klasing |
| 3,988,944 A | 11/1976 | Klasing |
| 4,291,793 A | 9/1981 | Klasing |
| 5,469,941 A | 11/1995 | Horvath |
| 5,558,411 A | 9/1996 | Kanjo et al. |
| 6,148,965 A | 11/2000 | Forbes et al. |
| 6,298,749 B1 | 10/2001 | Stroer et al. |
| 6,325,465 B1 | 12/2001 | Sommerfeld et al. |
| 6,364,069 B1 | 4/2002 | Ring |
| 6,364,428 B1 | 4/2002 | Labriola et al. |
| 6,394,233 B1 | 5/2002 | Kanjo et al. |

(Continued)

FOREIGN PATENT DOCUMENTS

| EP | 1195309 | 4/2002 |
| EP | 1459953 | 9/2004 |

(Continued)

OTHER PUBLICATIONS

International Search Report Form PCT/ISA/220, International Application No. PCT/US2015/010787, pp. 1-10, dated May 4, 2015.

*Primary Examiner* — Bradley T King
(74) *Attorney, Agent, or Firm* — Bond Schoeneck & King, PLLC; David L. Nocilly

(57) ABSTRACT

A prolonged release system having a locking member pivotally mounted on a post within a hand brake and having an arm that contacts a clutch assembly to prevent the clutch assembly of the handbrake from engaging after it has been manually released. Rotation of the hand brake wheel causes a pawl on a ratchet gear to move into contact with a cam of the locking member so that the arm of the locking member moves out of contact with the clutch assembly. By maintaining the clutch assembly in a released position, the prolonged release system ensures that the brake chain drum is decoupled from the driveshaft of the hand brake and prevents the inadvertent application of the brakes. When a user turns the hand brake wheel, the locking member is disengaged from the clutch assembly and the hand brake can be set by a user.

9 Claims, 5 Drawing Sheets

(56) References Cited

U.S. PATENT DOCUMENTS

| | | | |
|---|---|---|---|
| 6,394,559 B1 | 5/2002 | Ring et al. |
| 6,397,978 B1 | 6/2002 | Jackson et al. |
| 6,474,450 B1 | 11/2002 | Ring et al. |
| 6,540,049 B1 | 4/2003 | Ring et al. |
| 6,789,855 B2 | 9/2004 | Herron |
| 7,021,430 B2 | 4/2006 | Ring et al. |
| 7,093,694 B2 | 8/2006 | Brandt et al. |
| 7,487,695 B2 | 2/2009 | Sommerfeld et al. |
| 7,559,411 B2 | 7/2009 | Michel et al. |
| 7,757,825 B2 | 7/2010 | Michel |
| 7,878,309 B2 | 2/2011 | Michel et al. |
| 8,172,045 B2 | 5/2012 | Michel |
| 8,307,955 B2 | 11/2012 | Sommerfeld et al. |
| 8,381,886 B2 | 2/2013 | Kanjo |
| 2007/0151812 A1 | 7/2007 | Michel et al. |
| 2008/0223669 A1 | 9/2008 | Kanjo |
| 2010/0059320 A1 | 3/2010 | Michel et al. |

FOREIGN PATENT DOCUMENTS

| | | |
|---|---|---|
| EP | 1462332 | 9/2004 |
| WO | 2010087914 | 8/2010 |

RAIL HANDBRAKE WITH PROLONGED RELEASE

BACKGROUND OF THE INVENTION

1. Field of the Invention

The present invention relates to hand brake release mechanisms for use on railway car braking systems and more particularly, to a prolonged release mechanism.

2. Description of the Related Art

Rail car hand brake mechanisms have a user wheel that is turned to rotate a drum to take up a chain attached to the rail car brake system, this allowing a user to manually engage the brakes. Hand brake mechanisms typically include a quick release mechanism, such as a handle that can be moved by a user, which allows for an immediate and full release of the hand brake. For example, movement of the handle will disengage a clutch assembly that connects the user wheel and drum, thereby the drum to freely rotate and release the brake chain. When the quick release mechanism is released, the clutch assembly reengages and the brake chain drum is reconnected to the wheel.

A major problem with hand brakes is that if the brake chain has not fully unwound, or if the motion of the rail car causes a loss of the slack in the brake chain, an inadvertent application of the rail car brakes can occur. Unintentional braking is a serious problem and can lead to overheating, the failure of the braking system, and damages truck wheels. To remedy this problem, prolonged release mechanisms have been incorporated into the hand brake to prevent the clutch from reengaging after the quick release handle has been pulled and returned to the original position. For example, U.S. Pat. No. 8,123,004 discloses a prolonged release mechanism that maintains the clutch in the disengaged position even if the quick release handle is moved back. Although the prolonged release mechanism does disengage when the user turns the hand brake wheel, the posts on the ratchet wheel that knock the mechanism out of engagement with the clutch assembly is not a robust design, and thus could be improved to ensure longevity of the system.

BRIEF SUMMARY OF THE INVENTION

The present invention comprises a prolonged release system for a rail car hand brake having a locking member that is pivotally mounted on a post within the hand brake and has an arm positioned proximately to a clutch assembly of the hand brake as well as a cam positioned proximately to a pawl that is coupled to a ratchet wheel of the hand brake. The locking member can pivot about the post between a first position, where the arm prevents the clutch assembly from engaging, and a second position, where the arm allows the clutch assembly to engage. The locking member is biased into the prolonged release position and disengaged when rotation of the ratchet wheel causes the pawl to contact the cam of the locking member so that the first arm of the locking member moves from the first position to the second position.

The locking member of the prolonged release system can be positioned on the same post as the pawl or on a different post that extends in parallel to the post of the pawl. In either case, the locking member selectively engages the yoke assembly of the clutch assembly to retain the axially movable clutch member in the declutched position by pivoting into engagement with the yoke after the yoke has moved the movable clutch member connector plate into a disengaged position. The locking member may have a notch that engages a tab associated with the yoke, or a radius that assists a planar portion to flushly engage the yoke directly. By maintaining the clutch assembly in the released position, the prolonged release system ensures that the brake chain drum is decoupled from the driveshaft of the hand brake. When a user subsequently turns the hand brake wheel, rotation of the driveshaft causes the locking member to disengage from the clutch assembly so that the clutch can reengage, thereby ending the prolonged release and recoupling the brake chain drum to the driveshaft and wheel so that the hand brake can be set by a user.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
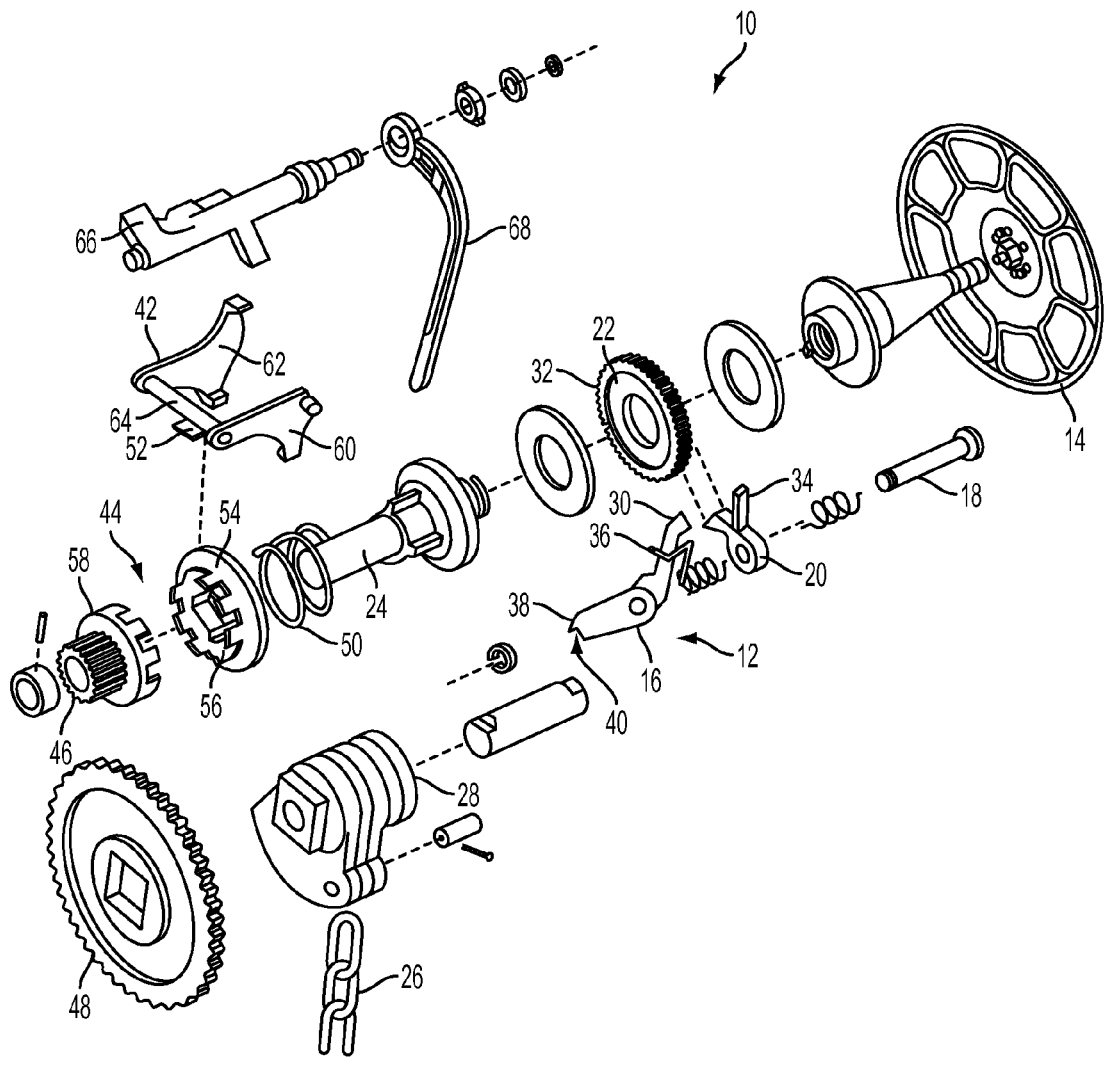
FIG. 1 is an exploded perspective view of a rail car hand brake having a prolonged release mechanism according to the present invention.

Referring now to the drawings, wherein like reference numerals refer to like parts throughout, there is seen in FIG. 1 a rail car hand brake 10 that has been outfitted with a prolonged release mechanism 12 for maintaining hand brake 10 in the released position until such time as a user manually rotates the wheel 14 of hand brake 10. The general structure of rail car hand brake 10 is known in the art and disclosed in various publications and will only be discussed herein as it pertains to prolonged release mechanism 12.

Referring to FIG. 1, prolonged release mechanism 12 comprises a locking arm 16 that pivots about a post 18, which may be the same post that supports the pawl 20 of a ratchet gear 22 positioned on a hand brake driveshaft 24. Pawl 20 and ratchet gear 22 are used to prevent counter-rotation of drive shaft 24 if a user releases wheel 14 and shaft 24 is under torque, such as when a brake chain 26 has been wound around a drum 28 to set the rail car brakes in an applied position. Locking arm 16 includes a trigger cam 30 that is positioned proximately to and slightly spaced apart from pawl 20 of ratchet gear 22. When ratchet gear 22 is rotated, pawl 20 will move up and down as it translates across the toothed surface 32 of ratchet gear 22. Due to this motion, pawl 20 will contact trigger cam 30 and cause locking arm 16 to pivot about post 18 against the bias of a trigger spring 36. A trigger tab 34 may be provided on pawl 20 to encourage contact between pawl 20 and trigger cam 30.

Figure 2:
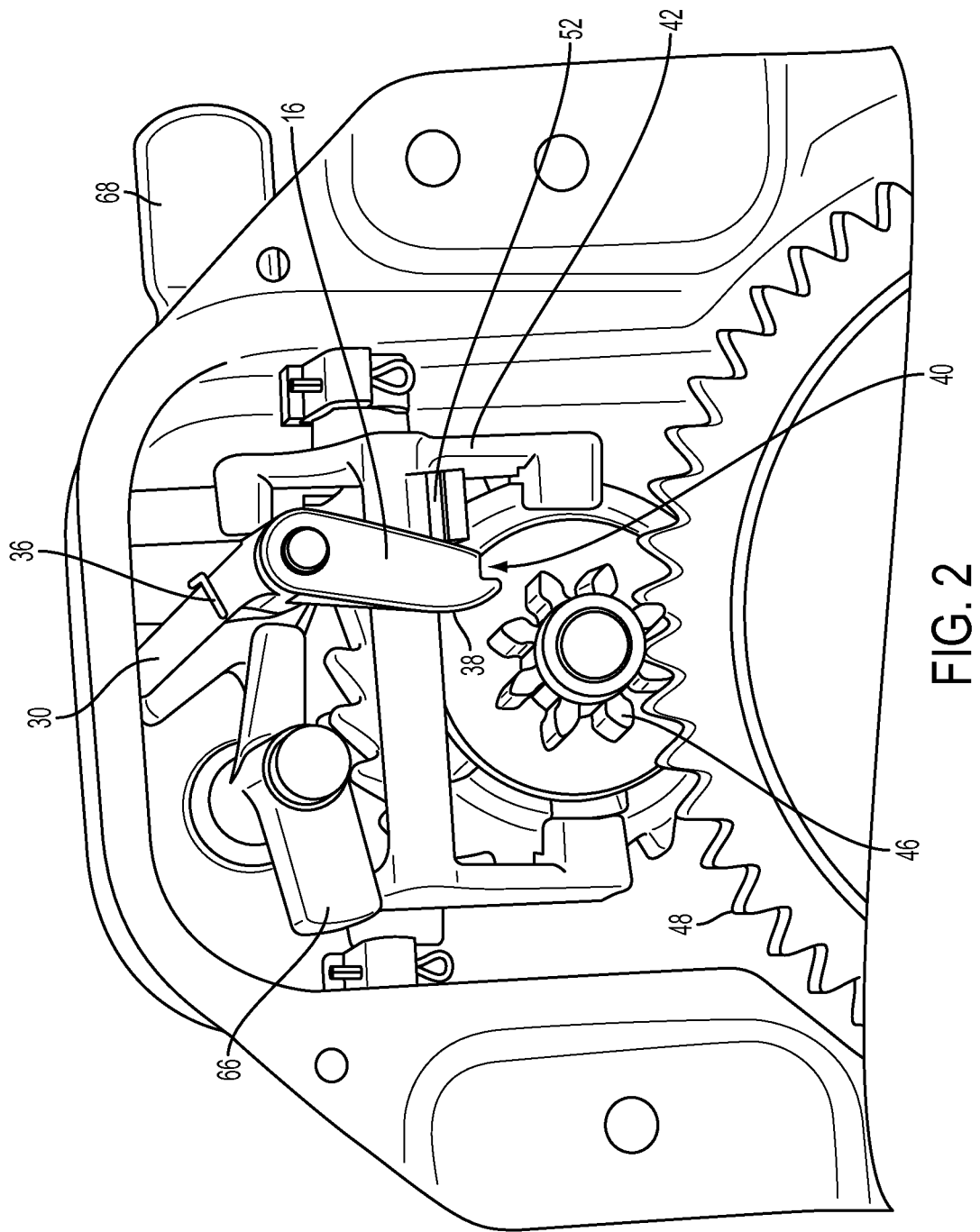
FIG. 2 is perspective view of a prolonged release mechanism according to the present invention in the disengaged position.
Figure 3:
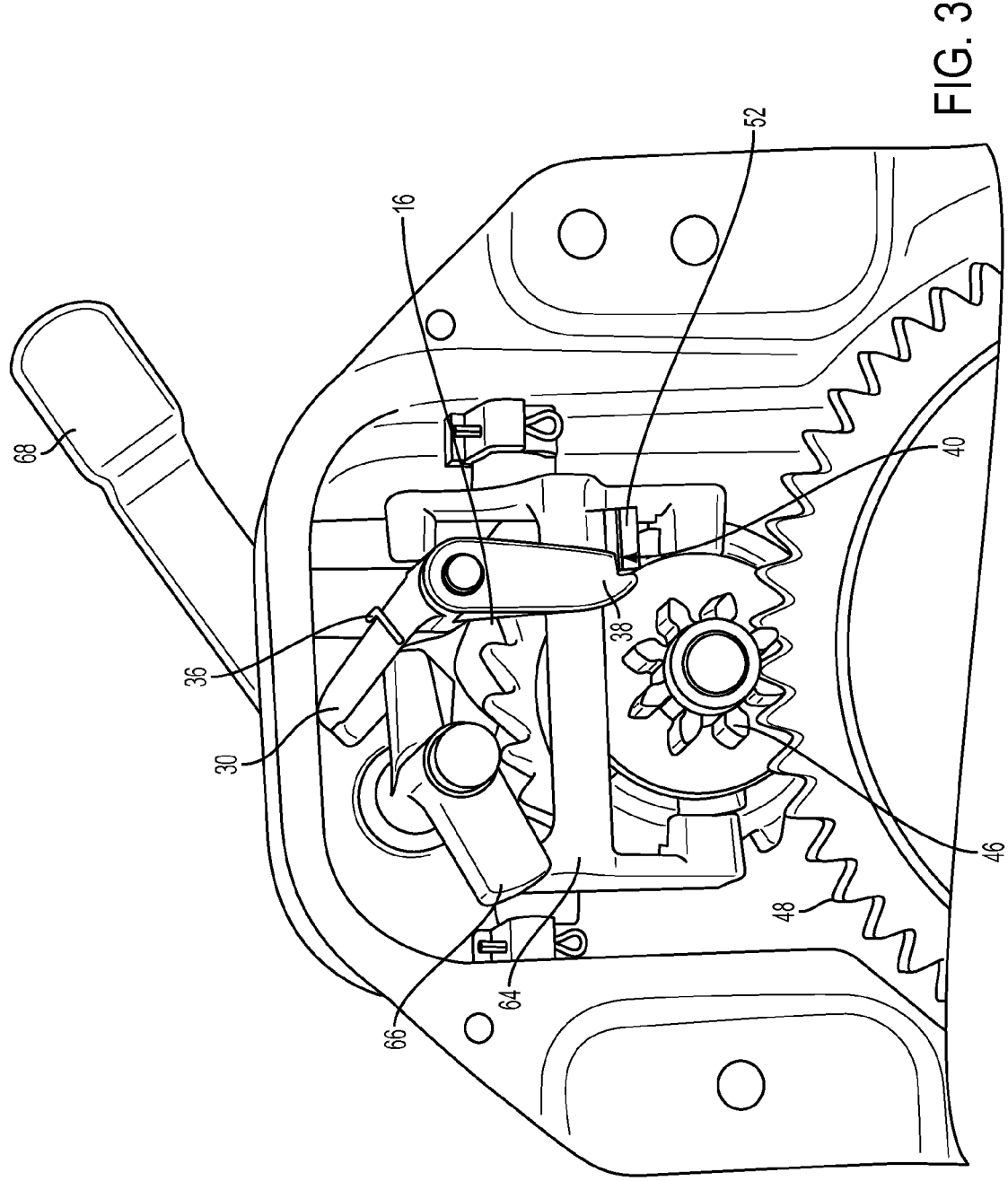
FIG. 3 is perspective view of a prolonged release mechanism according to the present invention in the engaged position.

Locking arm 16 includes a locking end 38 extending outwardly from and positioned on the opposing side of post 18 from trigger cam 30. Locking arm 16 is biased by trigger spring 36 to rotate locking end 38 toward the prolonged release position. In the prolonged release position, a notch 40 in locking end 38 will selectively retain the hand brake clutching assembly in the released position once it has been manually released by a user. As seen in FIGS. 2 and 3, locking end 38 and notch 40 are positioned and configured to releasably lock the clutch assembly by engaging a pivoting yoke 42 used to selectively disengage a clutch 44 that is positioned along driveshaft 24. Clutch 44, when engaged, allows the rotation of driveshaft 24 to drive a pinion 46 that is connected to the main gear 48 of a drum 28. Drum 28 is used to wind up a brake chain 26 connected to the rail car brakes, thus mechanically applying the brakes and allowing a user to set the brakes by hand. Clutch 44 comprises a connector plate 54 that is rotationally fixed about driveshaft 24 but moveable axially along driveshaft 24 into a first position, where connector plate 54 closes clutch 44, and a second position, where connector plate 54 disengages clutch 44. For example, connector plate 54 may be biased, such as by a spring 50, to move a clutch teeth 56 fixedly connected to connector plate 54 (and thus also rotationally fixed to driveshaft 24) into engagement with a toothed clutch half 58 that is attached to pinion 46. Toothed clutch half 58 and pinion 46 are fixed axially along driveshaft 24, but free to rotate about driveshaft 24 if first clutch half 56 is disengaged from toothed clutch half 58.

When clutch 44 is engaged, driveshaft 24 and toothed clutch half 58 are rotationally interlocked so that rotation of driveshaft 24 will cause rotation of pinion 46. Thus, when clutch 44 is engaged, rotation of pinion 46 will drive main gear 48 and drum 28 to take up brake chain 26 as driveshaft 24 is rotated by wheel 14, thereby applying or releasing the rail car brakes. Clutch 44 is disengaged by applying a force to connector plate 54 so that connector plate 54 and clutch teeth 56 translate along driveshaft 24 against a bias force provided by spring 50 to separate first clutch half 56 from second clutch half 58. When clutch 44 is disengaged, pinion 46 is rotationally separated from driveshaft 24 and thus free to rotate relative to driveshaft 24. As a result, main gear 48 and drum 28 are released from driveshaft 24 and free to unwind if under a load, such as a wound up chain 26, which will consequently unwind and stay in the unwound or 'brakes released' position as main gear 48 and drum 28 are no longer operably connected to driveshaft 24.

As seen in FIGS. 1 and 2, connector plate 54 is positioned so that it may be moved axially along driveshaft 24 in response to a pivoting of yoke 42, which has a pair of opposing arms 60 and 62 that are held in spaced relation by connecting rod 64. A cam 66 may be rotated into and out of engagement with connecting rod 64, thereby driving yoke 42 so that yoke arms 60 and 62 move from a first position, where yoke arms 60 and 62 are disengaged from connector plate, into a second position, where yoke arms 60 and 62 engage connector plate 54 and push it axially along driveshaft 24 against bias of spring 50 so that clutch 44 disengages. FIG. 2 depicts yoke 42 in the first position and FIG. 3 depicts yoke 42 in the second position after being pivoted by cam 66. Cam 66 is typically interconnected to a lever 68 so that a user can quickly release hand brake 10 by moving lever 68 and rotating cam 66 to disengage clutch 44.

Connecting rod 64 includes a tab 52 extending outwardly from an intermediate portion thereof for selective engagement with notch 40 of locking end 38 when yoke 42 has been pivoted into its second position and yoke arms 60 and 62 are pushed against connector plate 54. When yoke 42 has been fully rotated and connector plate 54 has moved into the second position, as seen in FIG. 3, locking end 38 is pivoted under the bias of trigger spring 36 so that notch 40 of locking end 38 engages tab 52 and retains yoke 42 in contact with connector plate 54. As seen in FIG. 3, notch 40 and tab 52 are dimensioned and positioned so that tab 52 will remain seated in notch 40 even if cam 66 rotates out of engagement with connecting rod 64 of yoke 42. As a result, clutch 44 is maintained in the disengaged position so that hand brake 10 is kept in a released configuration for a prolonged period, i.e., until pawl 20 moves along up and down when it translates along the teeth 32 of ratchet gear 22. When pawl 20 moves it causes trigger tab 34 to bump trigger cam 30 and pivot locking arm 16 so that notch 40 is moved away from and releases release tab 52. Yoke 42 is then free to return to the first position, as seen in FIG. 2, as connector plate 54 is biased by spring 50 and clutch 44 reengages.

In operation, prolonged release mechanism 12 automatically retains hand brake 10 in the released position after a user manually releases hand brake 10 using handle 68, which moves yoke 42 so that clutch 44 disengages to separate brake chain drum 28 from driveshaft 24. Locking arm 16 is biased into the prolonged release position and will thus pivot so that locking end 38 engages tab 52 of yoke 42 to maintain yoke 42 in engagement with clutch 44 so that drum 28 remains uncoupled from driveshaft 24. If a user rotates wheel 14, pawl 20 of ratchet gear 22 will translate across teeth 32 so that trigger tab 34 contacts trigger cam 30, thereby causing interlock 30 to pivot so that locking end 38 moves out of engagement with yoke 42. Yoke 42 will move out of contact with clutch 44 so that clutch can return under the bias of spring 50 to the engaged position where driveshaft 24 is again coupled to drum 28. Thus, prolonged release mechanism 12 automatically prolongs the release of hand brake 10 by preventing reengagement of the clutch assembly until there is subsequent manual rotation of wheel 14, such as when a user next sets hand brake 10.

Figure 4:
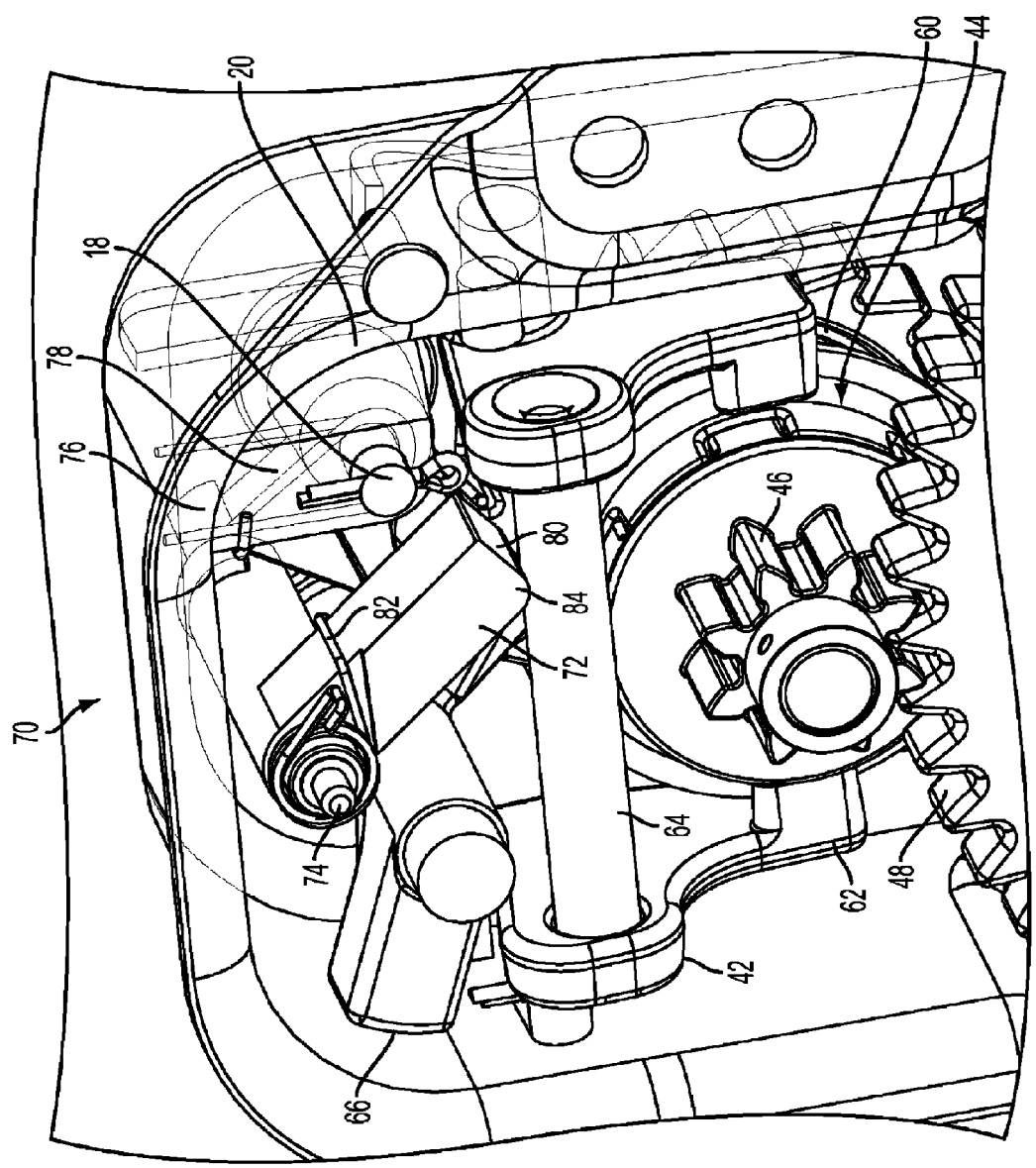
FIG. 4 is a perspective view of another prolonged release mechanism according to the present invention in the disengaged position.
Figure 5:
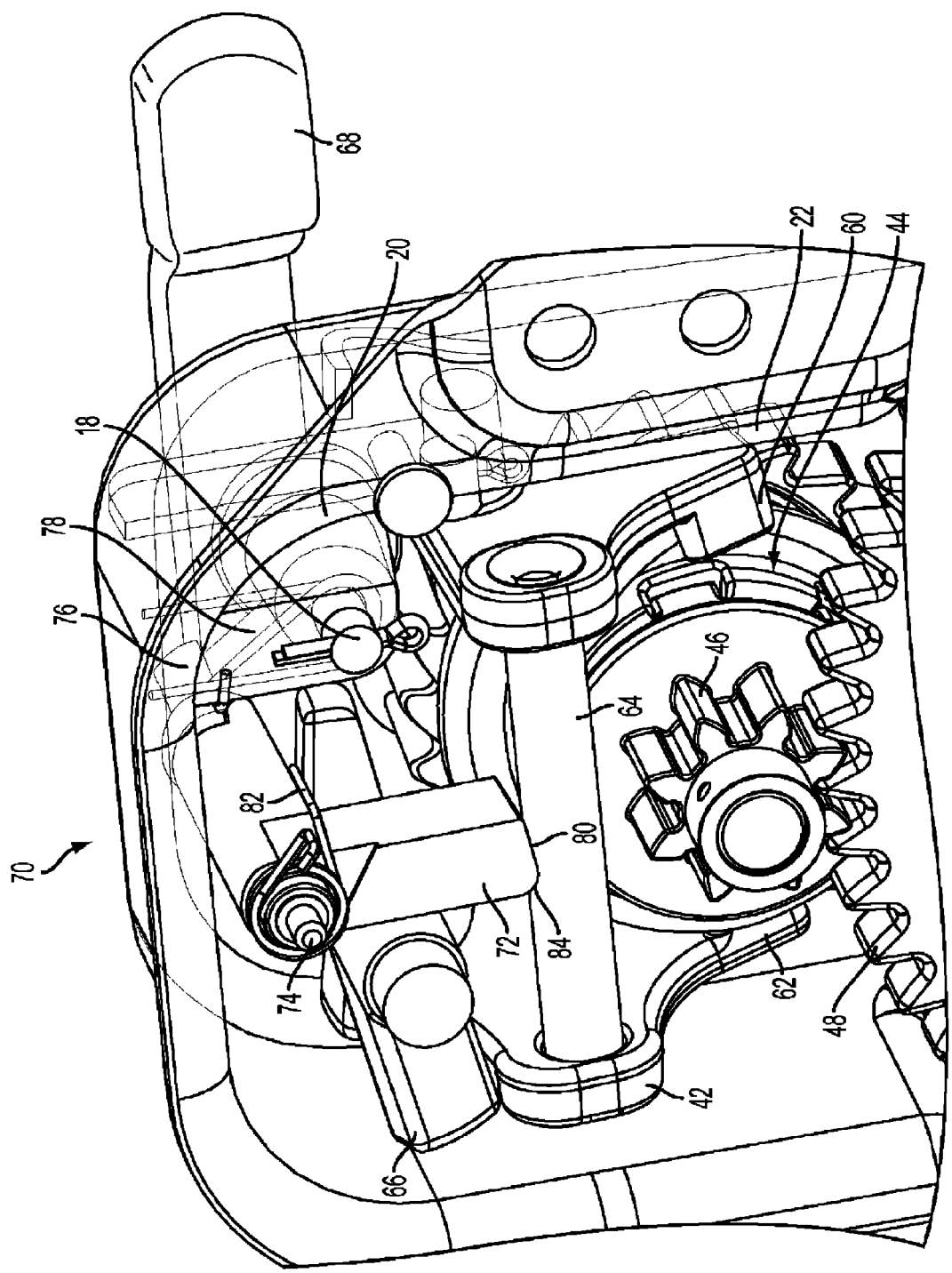
FIG. 5 is a perspective view of another prolonged release mechanism according to the present invention in the engaged position.

In another embodiment seen in FIGS. 4 and 5, a prolonged release mechanism 70 includes a locking arm 72 that is positioned on and pivots about the end of a post 74 that extends parallel to pin 18 about which pawl 20 of ratchet wheel 22 pivots. Locking arm 72 includes a single tooth gear 76 or cam portion that is positioned to selectively engage a corresponding single tooth gear 78 or cam portion associated with pawl 20. Locking arm 72 pivots between a first position, where a planar surface 80 of locking arm 72 flushly engages an intermediate portion of connecting rod 64 of yoke 42 and holds yoke 42 in place so that clutch 44 is disengaged, and a second position, where arm 72 releases connecting rod 64 so that clutch 44 can reengage. FIG. 4 illustrates locking arm 72 in the released position relative to yoke 42 and FIG. 5 illustrates locking arm 72 in the engaged position relative to yoke 42 so that clutch 44 has disengaged to prolong the release of hand brake 10.

Locking arm 72 is biased by a wire spring 82 into the first position so that as soon as yoke 42 is moved to disengage clutch 44, locking arm 72 will pivot into flush engagement with and hold yoke 42 in place. Wire spring 82 may be connected at one end to locking arm 72 and at an opposing end to a fixed surface such as the housing of hand brake 10. When ratchet wheel 22 is turned, movement of pawl 20 will cause single tooth gear 78 to contact corresponding single tooth gear 76 of locking arm 72 thereby rotating planar surface 80 of locking arm 72 far enough out of flush engagement with connecting rod 64 of yoke 42 so that yoke 42 can move into the declutched position. Preferably, the bias forces applied to yoke 42 exceeds the bias force moving locking arm 72 into the engaged position so that yoke 42 can move into the declutched position as soon as locking arm 72 has rotated sufficiently to move planar surface 80 out of flush engagement with connecting rod 64. As seen in FIGS. 4 and 5, one end of planar surface 80 of arm 72 may include a radius 84 that allows connecting rod 64 of yoke 42 and planar surface 80 of locking arm 72 to more readily engage and disengage.

As before, prolonged release mechanism 70 will automatically retain hand brake 10 in the released position after a user manually releases hand brake 10 using handle 68, which moves yoke 42 so that clutch 44 disengages to separate brake chain drum 28 from driveshaft 24. Locking arm 72 is biased into the prolonged release position and will thus pivot so surface 80 engages yoke connecting rod 64 to maintain yoke 42 in engagement with clutch 44 so that drum 28 remains uncoupled from driveshaft 24. If a user rotates wheel 14, pawl 20 of ratchet gear 22 will translate across teeth 32 so that single tooth gear 78 contacts single tooth gear 76, thereby causing locking arm 72 to pivot so that surface 80 moves out of engagement with yoke connecting rod 64. Yoke 42 will then move out of contact with clutch 44 so that clutch 44 can return under the bias of spring 50 to the engaged position where driveshaft 24 is again coupled to drum 28. Thus, prolonged release mechanism 70 automatically prolongs the release of hand brake 10 by preventing reengagement of the clutch assembly until there is subsequent manual clockwise rotation of wheel 14, such as when a user next sets hand brake 10.

What is claimed is:

1. A prolonged release system for a rail car hand brake, comprising:
   a post extending within the hand brake;
   a locking member pivotally mounted on the post and having an arm positioned proximately to a clutch assembly of the hand brake and a portion positioned proximately to a pawl that is coupled to a ratchet wheel of the hand brake;
   wherein the locking member can pivot about the post between a first position, where the arm prevents the clutch assembly from engaging, and a second position, where the arm allows the clutch assembly to engage; and
   wherein rotation of the ratchet wheel causes the pawl to contact the portion of the locking member so that the first arm of the locking member moves from the first position to the second position.

2. The system of claim 1, wherein the pawl is positioned on a second post that extends in parallel to the post of the locking member.

3. The system of claim 2, wherein the clutch assembly comprises a first clutch member that is rotationally fixed to a driveshaft and axially moveable along the driveshaft between an engaged position, where the first clutch member interlocks with a second clutch member that is free to rotate about the driveshaft, and a disengaged position, where the first clutch member is spaced apart from the second clutch member.

4. The system of claim 3, wherein the clutch assembly further comprises a yoke that is pivotally mounted to move the first clutch member between the engaged position and the disengaged position.

5. The system of claim 4, wherein the arm of the locking member pivots into the first position to prevent movement of the yoke after the yoke has moved the first clutch member into the disengaged position.

6. The system of claim 5, wherein the arm of the locking member includes a planar portion that abuts the yoke when arm is in the first position.

7. The system of claim 6, wherein the arm of the locking member further includes a radius adjacent to the planar portion.

8. The system of claim 7, wherein the yoke comprises a pair of yoke arms separated by a connecting rod and the planar portion of the arm engages the connecting rod of the yoke when the locking member is in the first position and the yoke has moved the first clutch member into the disengaged position.

9. The system of claim 8, further comprising a brake chain drum coupled to the second clutch member.

* * * * *